(12) United States Patent
Hayashi et al.

(10) Patent No.: US 8,851,224 B2
(45) Date of Patent: Oct. 7, 2014

(54) WORK VEHICLE

(71) Applicant: Komatsu Ltd., Tokyo (JP)

(72) Inventors: Daisuke Hayashi, Komatsu (JP); Nobuo Matsuyama, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/114,926

(22) PCT Filed: Dec. 12, 2012

(86) PCT No.: PCT/JP2012/082135
§ 371 (c)(1),
(2), (4) Date: Oct. 31, 2013

(87) PCT Pub. No.: WO2014/064853
PCT Pub. Date: May 1, 2004

(65) Prior Publication Data
US 2014/0116797 A1    May 1, 2014

(51) Int. Cl.
*B60K 13/04*    (2006.01)
(52) U.S. Cl.
CPC ........................ *B60K 13/04* (2013.01)
USPC .......................... 180/309; 180/296
(58) Field of Classification Search
USPC ............. 180/296, 309; 60/272, 299, 311
See application file for complete search history.

(56) References Cited

U.S. PATENT DOCUMENTS

| 8,191,668 B2 * | 6/2012 | Keane et al. .................. 180/296 |
| 8,418,448 B2 * | 4/2013 | Kamata et al. .................. 60/322 |
| 2010/0031644 A1 | 2/2010 | Keane et al. |
| 2010/0186394 A1 | 7/2010 | Harrison et al. |

FOREIGN PATENT DOCUMENTS

| JP | 2006-70712 A | 3/2006 |
| JP | 2008-156835 A | 7/2008 |
| JP | 2010-229959 A | 10/2010 |
| JP | 2012-2016 A | 1/2012 |
| JP | 2012-97413 A | 5/2012 |
| JP | 2012-184602 A | 9/2012 |
| WO | 2011152306 A1 | 8/2011 |

OTHER PUBLICATIONS

International Search Report for PCT/JP2012/082135, issued on Jan. 22, 2013.
Japanese Office Action for the corresponding Japanese application No. 2013-512672, issued on Jun. 11, 2013.

* cited by examiner

*Primary Examiner* — John Walters
(74) *Attorney, Agent, or Firm* — Global IP Counselors, LLP

(57) ABSTRACT

A wheel loader includes a vehicle frame, an engine, a supporting mechanism, a diesel articulate filtering device, and a connecting pipe. The engine is mounted on the vehicle frame, and the supporting mechanism is fixed to the vehicle frame. The diesel particulate filtering device is mounted on the supporting mechanism above the engine and has an exhaust gas inlet facing the rear. An exhaust upstream side end part of the connecting pipe is coupled to an exhaust part of the engine, and an exhaust downstream side end part of the connecting pipe is connected to an exhaust gas inlet of the diesel particulate filtering device from the rear. The connecting pipe includes an extending part that is disposed below the diesel particulate filtering device and extends rearward of the diesel particulate filtering device from the exhaust upstream side end part, and a flexible pipe part provided in the extending part.

8 Claims, 11 Drawing Sheets

WORK VEHICLE

CROSS-REFERENCE TO RELATED APPLICATIONS

This application is a U.S. National stage application of International Application No. PCT/JP2012/082135, filed on Dec. 12, 2012. This U.S. National stage application claims priority under 35 U.S.C. §119(a) to Japanese Patent Application No. 2012-237065, filed in Japan on Oct. 26, 2012, the entire contents of which are hereby incorporated herein by reference.

BACKGROUND

1. Field of the Invention

The present invention relates to a work vehicle and in particular to a work vehicle equipped with an exhaust gas post-processing device above an engine.

2. Background Information

An exhaust gas post-processing device is mounted on a work vehicle. The exhaust gas post-processing device includes a diesel particulate filtering device that collects and removes particulate matter of soot and the like included in the diesel engine exhaust. The diesel particulate filtering device is mounted in a row with an air cleaner on an upper part of the engine. A nitrogen oxide reduction catalytic converter may also be provided to remove NOx from the exhaust gas. The nitrogen oxide reduction catalytic converter is provided on the exhaust downstream side of the diesel particulate filtering device.

As described above, the diesel particulate filtering device is mounted on an upper part of the engine with an air cleaner and supported directly on the engine. Therefore, when a nitrogen oxide reduction catalytic converter is added, the nitrogen oxide reduction catalytic converter is provided on the upper part of the engine on the exhaust downstream side of the diesel particulate filtering device.

However, when the diesel particulate filtering device is mounted on the engine in addition to the nitrogen oxide reduction catalytic converter, the combined weight of the devices becomes very large and the center of gravity of the engine becomes higher. As a result, engine vibration increases which is undesirable.

Accordingly, as described in Japanese Laid-open Patent Publication No. 2012-97413, a configuration has been proposed in which a table is provided on a vehicle frame and the diesel particulate filtering device and the nitrogen oxide reduction catalytic converter are mounted on the table.

SUMMARY

The engine is generally supported on the vehicle frame by rubber mounts. Conversely, the table described in Japanese Laid-open Patent Publication No. 2012-97413 is fixed directly to the vehicle frame. Therefore, vibrations from the engine and from the exhaust gas post-processing device mounted on the table are different when the exhaust gas post-processing device is mounted on the table provided separately from the engine. This difference in vibrations is absorbed by a flexible pipe provided between an exhaust part of the engine and the diesel particulate filtering device as described in Japanese Laid-open Patent Publication No. 2012-97413.

However, the flexible pipe described in Japanese Laid-open Patent Publication No. 2012-97413 is not able to sufficiently absorb the difference in both of the vibrations. This feature is explained in more detail below.

A pipe connecting the exhaust part of the engine and the diesel particulate filtering device is desirably short in consideration of costs and in the space occupied by the members. As a result, an exhaust gas inlet of the diesel particulate filtering device is disposed to face the exhaust part of the engine to shorten the distance therebetween, and the exhaust gas inlet and the exhaust part are connected by the flexible pipe in Japanese Laid-open Patent Publication No. 2012-97413.

As described above, the flexible pipe is shortened and the length of a portion with flexibility cannot be sufficiently secured in the configuration described in Japanese Laid-open Patent Publication No. 2012-97413. As a result, the aforementioned difference in the vibration from the engine and the vibration from the exhaust gas post-processing device cannot be sufficiently absorbed.

Further, an installation error is produced when installing the engine and the exhaust gas post-processing device in the configuration of Japanese Laid-open Patent Publication No. 2012-97413 since both devices are supported separately on the vehicle frame. However, sufficiently absorbing the installation error between the engine side and the exhaust gas post-processing side with the flexible pipe of Japanese Laid-open Patent Publication No. 2012-97413 is difficult due to the same reason as described above.

An object of the present invention is to sufficiently absorb a difference in vibrations between the engine side and the exhaust gas post-processing side and an installation error between the engine side and the exhaust gas post-processing side in a work vehicle in which the exhaust gas post-processing device is installed on a supporting mechanism provided separately from the engine.

A work vehicle according to a first aspect of the present invention is equipped with a vehicle frame, an engine mounted on the vehicle frame, a supporting mechanism fixed to the vehicle frame, a diesel particulate filtering device, and a connecting pipe. The diesel particulate filtering device is mounted on the supporting mechanism above the engine and has an exhaust gas inlet facing rearward. The connecting pipe of which an exhaust upstream side end part is coupled to an exhaust part of the engine and an exhaust downstream side end part is connected to an exhaust gas inlet of the diesel particulate filtering device from the rear. The connecting pipe includes an extending part that is disposed below the diesel particulate filtering device and extends rearward of the diesel particulate filtering device from the exhaust upstream side end, and a flexible pipe part that is provided in the extending part.

The supporting mechanism provided separately from the engine is fixed to the vehicle frame and the diesel particulate filtering device is mounted on the supporting mechanism. As a result, the engine and the diesel particulate filtering device vibrate with separate vibration systems. The engine and the diesel particulate filtering device are connected by the pipe unit with the flexible pipe part so that the difference between both of the vibrations is absorbed by the flexible pipe part.

As described above, the entire length of the conventional flexible pipe that connects the engine and the diesel particulate filtering device is short and thus a flexible portion cannot be sufficiently secured.

Accordingly in the present invention, the pipe unit extends from the exhaust part of the engine past the diesel particulate filtering device, and an end part thereof is coupled to the exhaust gas inlet of the diesel particulate filtering device from the rear. The pipe unit can be made sufficiently long with such a configuration. As a result, a relatively long flexible pipe part can be formed in the extending part that extends from the exhaust part of the engine past the diesel particulate filtering device, and the difference in the vibrations of the engine and the diesel particulate filtering device can be sufficiently absorbed. Further, the installation error between the engine and the diesel particulate collection and filtering device can be sufficiently absorbed by the same reason.

A work vehicle according to a second aspect of the present invention is related to the work vehicle of the first aspect, and the pipe unit has a downstream side part that extends from the rear toward the exhaust gas inlet of the diesel particulate filtering device, and a coupling part that connects a rear end part of the extending part and the downstream side part.

The pipe unit extends to the rear from the exhaust part of the engine to pass below the diesel particulate filtering device, and further extends upward to be coupled to the exhaust gas inlet of the diesel particulate filtering device from the rear. Therefore, as described above, a long portion that extends from the exhaust part of the engine and passes under the diesel particulate filtering device can be secured and a sufficiently long flexible pipe part can be formed in the long portion.

A work vehicle according to a third aspect of the present invention is related to the work vehicle of the second aspect, and the pipe unit has an upstream side pipe and a downstream side pipe. An exhaust upstream side end part of the upstream side pipe is coupled to the exhaust part of the engine, and the upstream side pipe extends rearward from the exhaust upstream side end part, and the exhaust downstream side of the upstream side pipe bends upward and is formed so that an exhaust downstream side end part opens upward. The downstream side pipe has a first pipe part that is coupled to the exhaust gas inlet of the diesel particulate filtering device, and a second pipe part that has a certain angle with respect to the first pipe part and is coupled to the exhaust downstream side end part of the upstream side pipe. The extending part is provided in the upstream side pipe. The downstream side part includes the first pipe part of the downstream side pipe and the coupling part includes the exhaust downstream side of the upstream side pipe and the second pipe part of the downstream side pipe.

The pipe unit is configured by the upstream side pipe and the downstream side pipe. As a result, an installation error between the engine side and the diesel particulate filtering device side can be absorbed in the coupling parts of both pipes. In particular, since the downstream side pipe is a so-called elbow pipe, the allowable range of installation error in the lateral and longitudinal directions can be broadened. Further, since the elbow pipe is used, projection of the downstream side pipe rearward can be suppressed, and in particular, space occupied by a portion unnecessary for vibration absorption can be made smaller.

A work vehicle according to a fourth aspect of the present invention is related to the work vehicle of the third aspect, and the upstream side pipe has spherical joints at the exhaust upstream side end part and the exhaust downstream side end part.

Since the spherical joints are provided at both ends of the upstream side pipe, an angle error that is produced during the installation of the engine and the diesel particulate filtering device can be easily absorbed.

A work vehicle according to a fifth aspect of the present invention is related to the work vehicle of the third or fourth aspects, and further includes a fixing member for fixing the exhaust downstream side part of the flexible pipe part of the upstream side pipe to the supporting mechanism.

The exhaust downstream side part (i.e., rear part) of the flexible pipe part of the upstream side pipe provided at the engine side is fixed to a supporting flange by the fixing member. Therefore, effects such as vibration absorption are not hindered and the upstream side pipe can be securely supported.

A work vehicle according to a sixth aspect of the present invention is related to the work vehicle of the fifth aspect, and the fixing member includes a fixing plate fixed to the supporting mechanism and a U-shaped metal fitting for fixing the exhaust downstream side part of the extending part of the upstream side pipe to the fixing plate.

The upstream side pipe can be easily attached or detached by attaching or detaching the U-shaped metal fitting.

A work vehicle according to a seventh aspect of the present invention is related to the work vehicle of any of the first to sixth aspects, and further includes a nitrogen oxide reduction catalytic converter for reducing nitrogen oxides in the exhaust gas and mounted on the supporting mechanism in front of the diesel particulate filtering device.

The nitrogen oxide reduction catalytic converter is provided in addition to the diesel particulate filtering device. In this case, the mass of the entire exhaust gas post-processing increases and the vibration becomes very large.

Under such a condition, vibration absorption can be effectively suppressed in particular by lengthening the pipe unit as in the present invention to provide a sufficient flexible pipe part.

A work vehicle according to an eighth aspect of the present invention is related to the work vehicle of the seventh aspect, and the front end of the pipe unit is located between the diesel particulate filtering device and the nitrogen oxide reduction catalytic converter.

If for example the exhaust part of the engine is located in front of the nitrogen oxide reduction catalytic converter, the distance between the exhaust part of the engine and the exhaust gas inlet would be relatively long even if the exhaust gas inlet of the diesel particulate filtering device were to face the engine exhaust part. Therefore, in this case, a flexible portion can be formed longer in the pipe unit and the need to lengthen the pipe unit as in the present invention to the rear of the diesel particulate filtering device is reduced.

However, under the condition in which the front end of the pipe unit is located between the nitrogen oxide reduction catalytic converter and the diesel particulate filtering device as in the work vehicle according to the eighth aspect, the length of the extending part, that is, the flexible pipe part, of the pipe unit cannot be secured sufficiently. Therefore, the present invention is particularly effective when the positional relationship between the pipe unit and the nitrogen oxide reduction catalytic converter and the diesel particulate filtering device is provided as described above.

A work vehicle according to a ninth aspect of the present invention is related to the work vehicle of the seventh aspect, and the exhaust gas inlet of the diesel particulate filtering device is provided on the same side as the exhaust part of the engine in the crosswise direction of the vehicle.

The length of the extending part of the pipe unit is secured while an unnecessary increase in the length of the entire pipe unit can be prevented.

The work vehicle according to a tenth aspect of the present invention is related to the work vehicle of any of the seventh to ninth aspects, and the diesel particulate filtering device has an exhaust gas outlet that faces to the front on the side opposite the exhaust gas inlet, and the diesel particulate filtering device is disposed so that the exhaust gas flows through an inside of the diesel particulate filter in a crosswise direction of the vehicle. The nitrogen oxide reduction catalytic converter is disposed in the same direction in which the diesel particulate filtering device is disposed so that the exhaust gas flows in the same direction as that of the diesel particulate filtering device.

In the present invention as described above, a difference in vibrations between the engine side and from the diesel particulate filtering device side and an installation error between the engine side and the diesel particulate filtering device side can be sufficiently absorbed in the work vehicle in which the diesel particulate filtering device is mounted on the supporting mechanism provided separately from the engine.

BRIEF DESCRIPTION OF DRAWINGS

FIG. 9 is a schematic view for explaining an adjustment function of a flange connecting part.

DETAILED DESCRIPTION OF EMBODIMENTS

Figure 1:
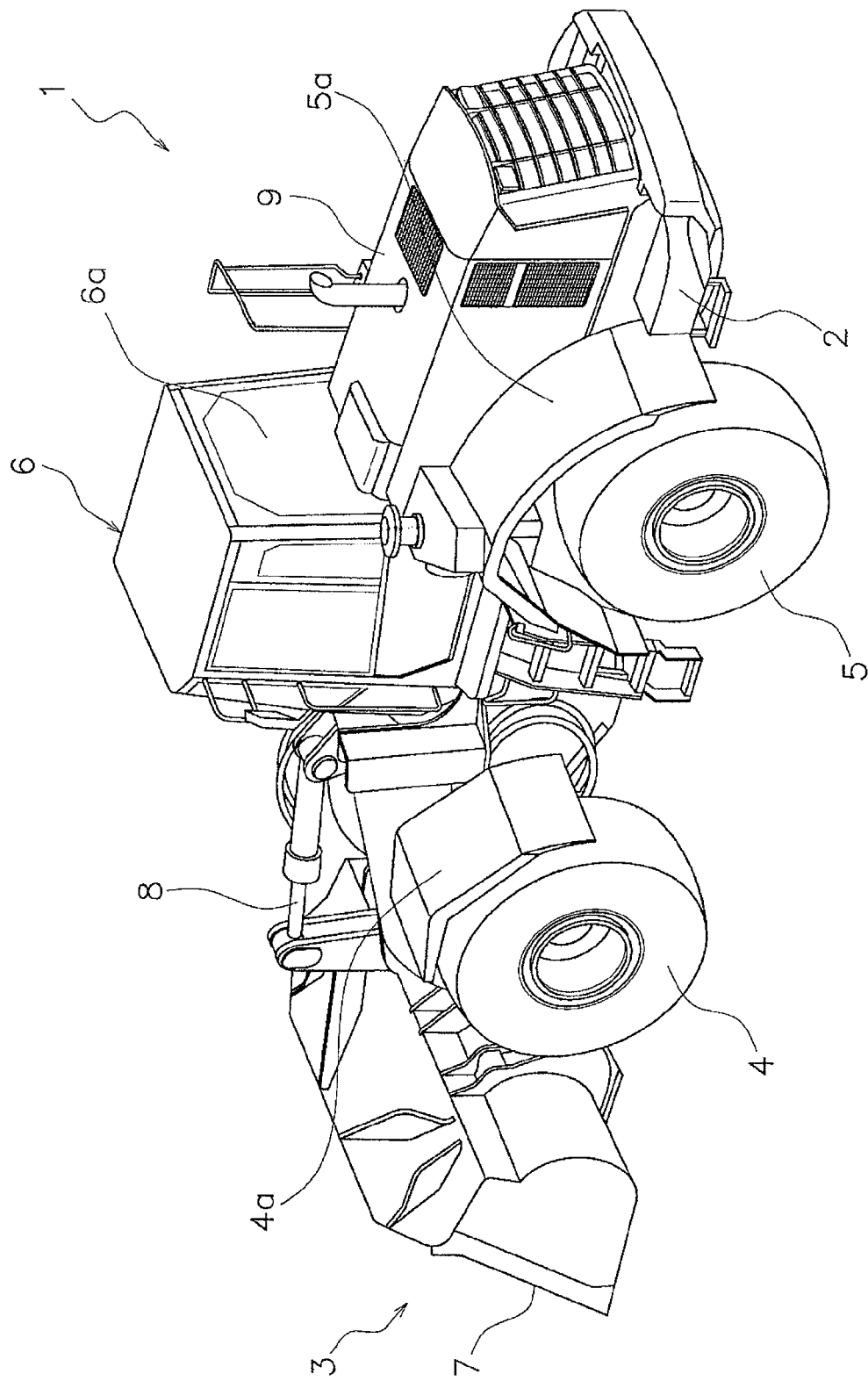
FIG. 1 is an external perspective view of a wheel loader according to a first embodiment of a work vehicle of the present invention.
Figure 2:
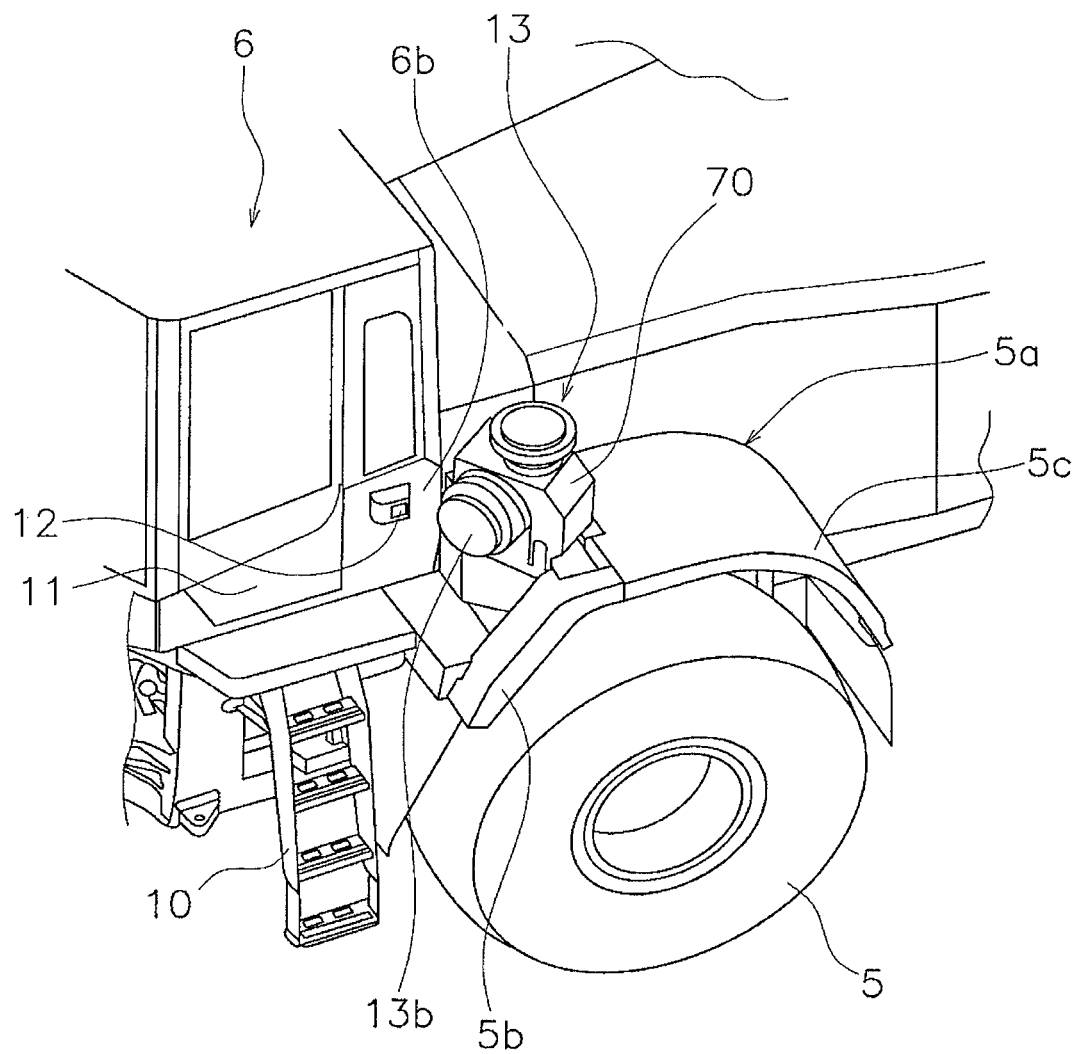
FIG. 2 is an external perspective partial view from the left front of the wheel loader of FIG. 1.

FIG. 1 illustrates an external perspective view of a wheel loader according to an embodiment of the work vehicle of the present invention. FIG. 2 illustrates a portion of the wheel loader on the left side of the cab.

In the following explanation, "front" refers to the front of the vehicle and "rear" refers to the rear of the vehicle. "Left" and "right" refer respectively to the left and right of the vehicle looking toward the front of the vehicle.

Overall Configuration

A wheel loader 1 includes a vehicle body frame 2, working equipment 3, front wheels 4, rear wheels 5, and a cab 6. The wheel loader 1 is capable of traveling due to the rotation of the front wheels 4 and the rear wheels 5, and desired work can be conducted using the working equipment 3.

The vehicle body frame 2 includes a front body part and a rear body part, and the front body part and the rear body part are connected to each other to allow for pivoting in the crosswise direction. The working equipment 3 and the front wheels 4 are provided on the front body part. The rear wheels 5 and the cab 6 are provided on the rear body part. The working equipment 3 is disposed at the front of the front body part and includes a bucket 7, a bucket cylinder 8 and the like. Fenders 4a, 5a are respectively provided above and to the rear of the front wheels 4 and the rear wheels 5. An operating cabin 6a and various operating members and an operating panel are provided inside the cab 6.

As illustrated in FIG. 2, steps 10 for ascending to and descending from the cab 6 are provided on the left side of the cab 6. The steps 10 are disposed in front of the rear wheel fender 5a. A door 11 is provided in the cab 6 with the rear thereof supported by a hinge on the cab body 6b and the front thereof being openable and closable. The maximum degree of opening of the door 11 is limited by a stopper 12 provided on the outside of the cab body 6b. An air cleaner 13 is disposed on an upper part of the rear wheel fender 5a on the left side while a detailed explanation is provided below. Foreign matter in the air drawn into the engine 15 is removed and the air is purified by the air cleaner 13.

Figure 3:
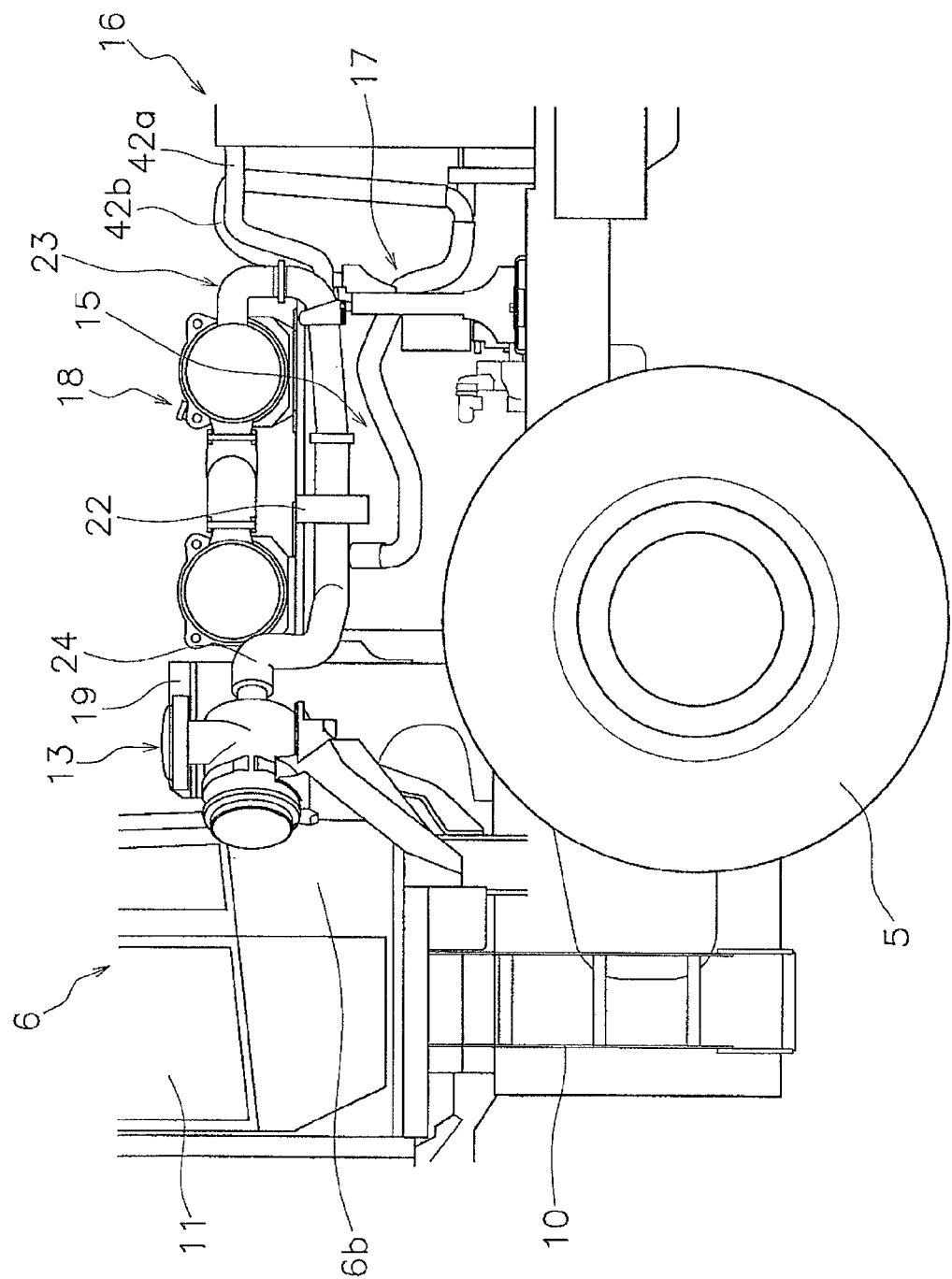
FIG. 3 is a side partial view with the vehicle body cover of the wheel loader of FIG. 1 removed.

FIG. 3 is a view of the rear body part as seen from the left side of the vehicle with a vehicle body cover 9 (FIG. 1) to the rear of the cab 6 removed. As illustrated in FIG. 3, the engine 15, a cooling unit 16 disposed to the rear of the engine 15, a supporting mechanism 17, and an exhaust gas post-processing device 18 mounted on the supporting mechanism 17 above the engine 15 are disposed in a rear part of the rear body part. An operating fluid tank 19 is disposed between the cab 6 and the engine 15.

Figure 4:
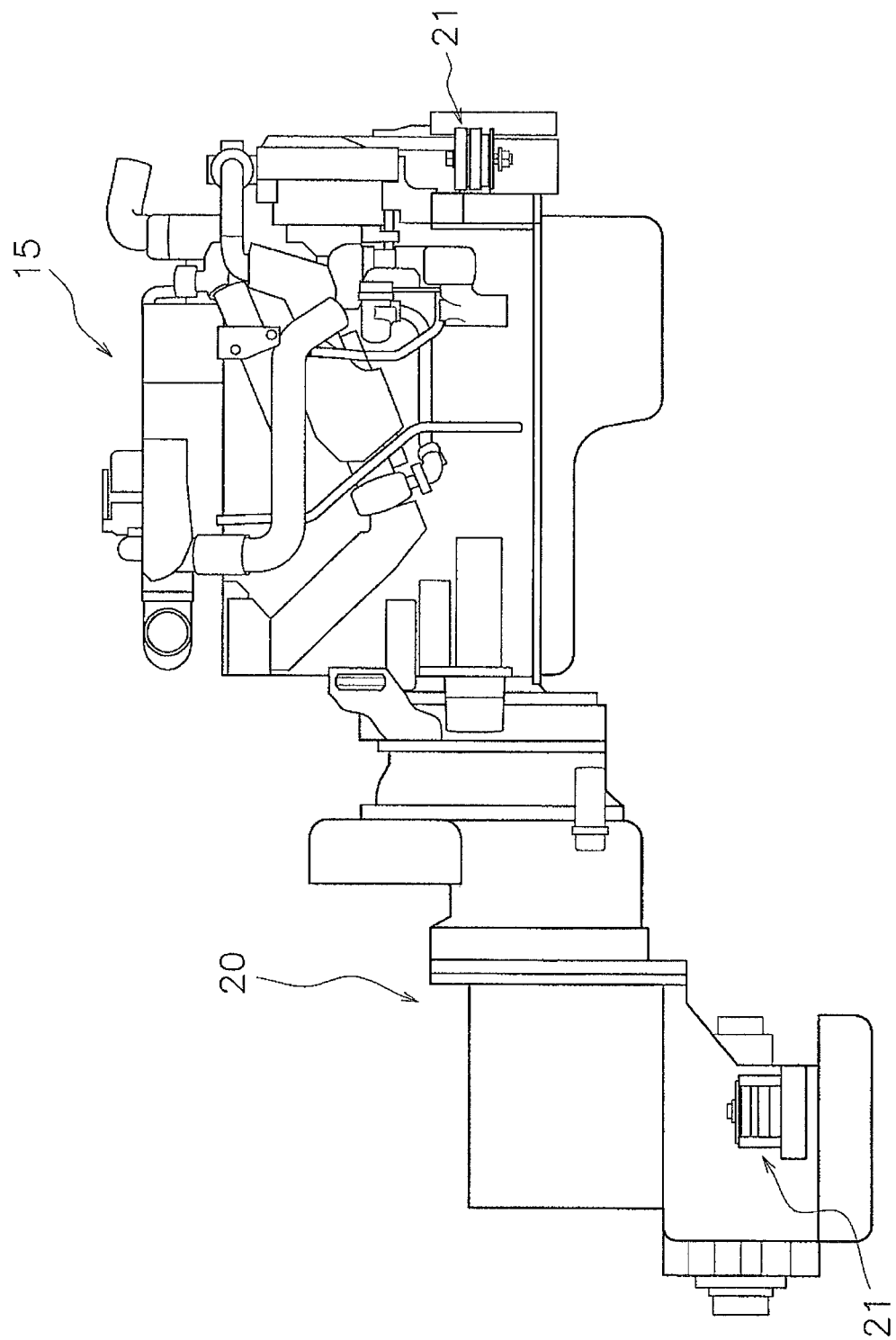
FIG. 4 illustrates a mounted state of an engine and a transmission.

The engine 15 is a so-called longitudinally mounted engine and is disposed so that a crankshaft extends in the front-back direction. The engine 15 is fixed to a transmission 20 with bolts to form an integrated construction as illustrated in FIG. 4. The engine 15 and the transmission 20 are supported on the vehicle body frame 2 via rubber mounts 21 in four locations.

As illustrated in FIG. 3, a turbo charger 22 that supercharges air by exhaust gas is provided on the left side of the engine 15. The turbo charger 22 is provided so that an exhaust gas outlet faces to the rear. A pipe unit 23 is provided between the turbo charger 22 and the exhaust gas post-processing device 18. A flexible intake pipe 24 made of rubber or plastic is provided between the turbo charger 22 and the air cleaner 13. A difference in vibration between the engine 15 and the air cleaner 13 is absorbed by the intake pipe 24.

Supporting Mechanism 17

Figure 5:
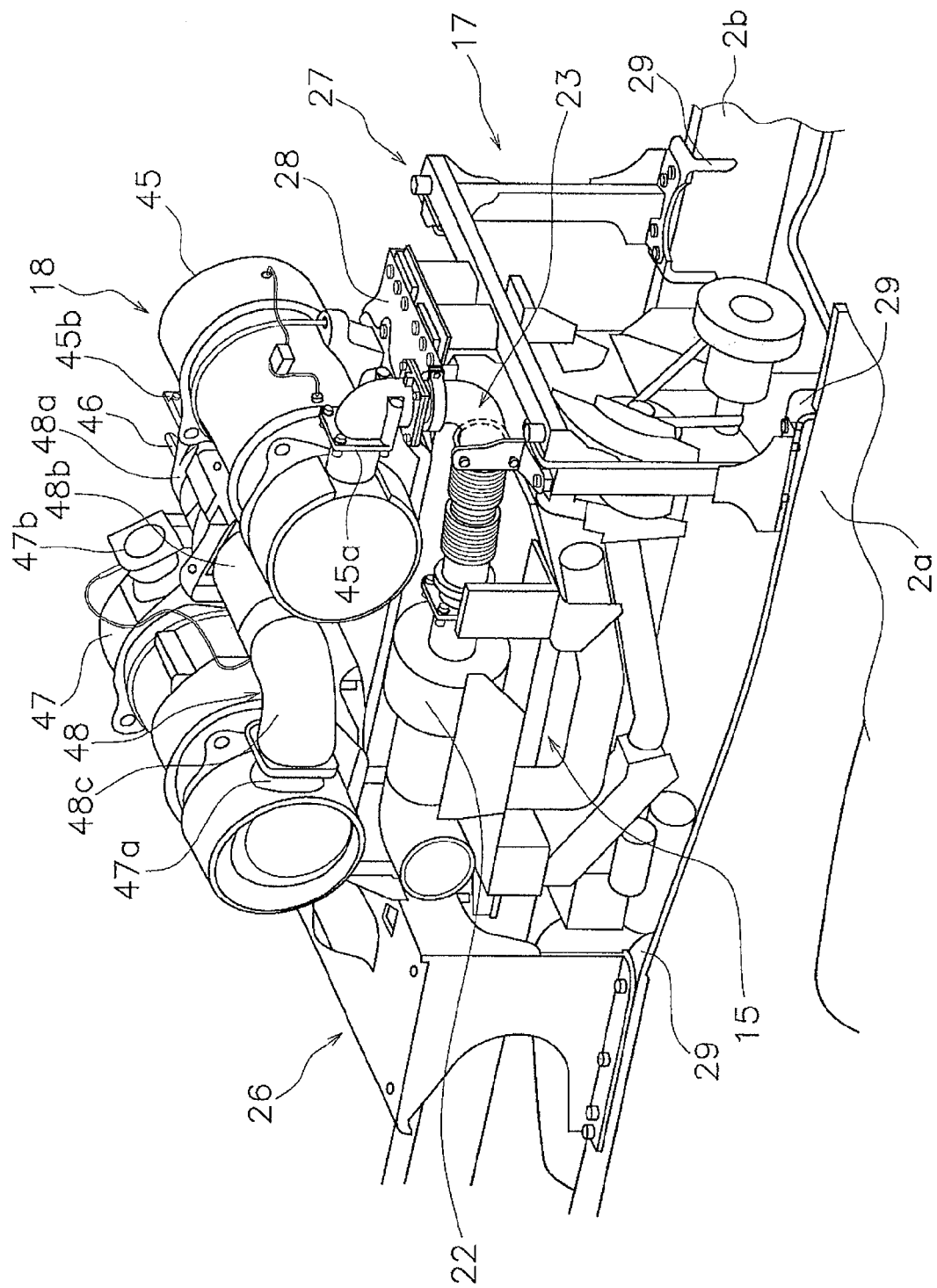
FIG. 5 is a perspective view illustrating an exhaust gas post-processing device and a supporting mechanism.
Figure 6:
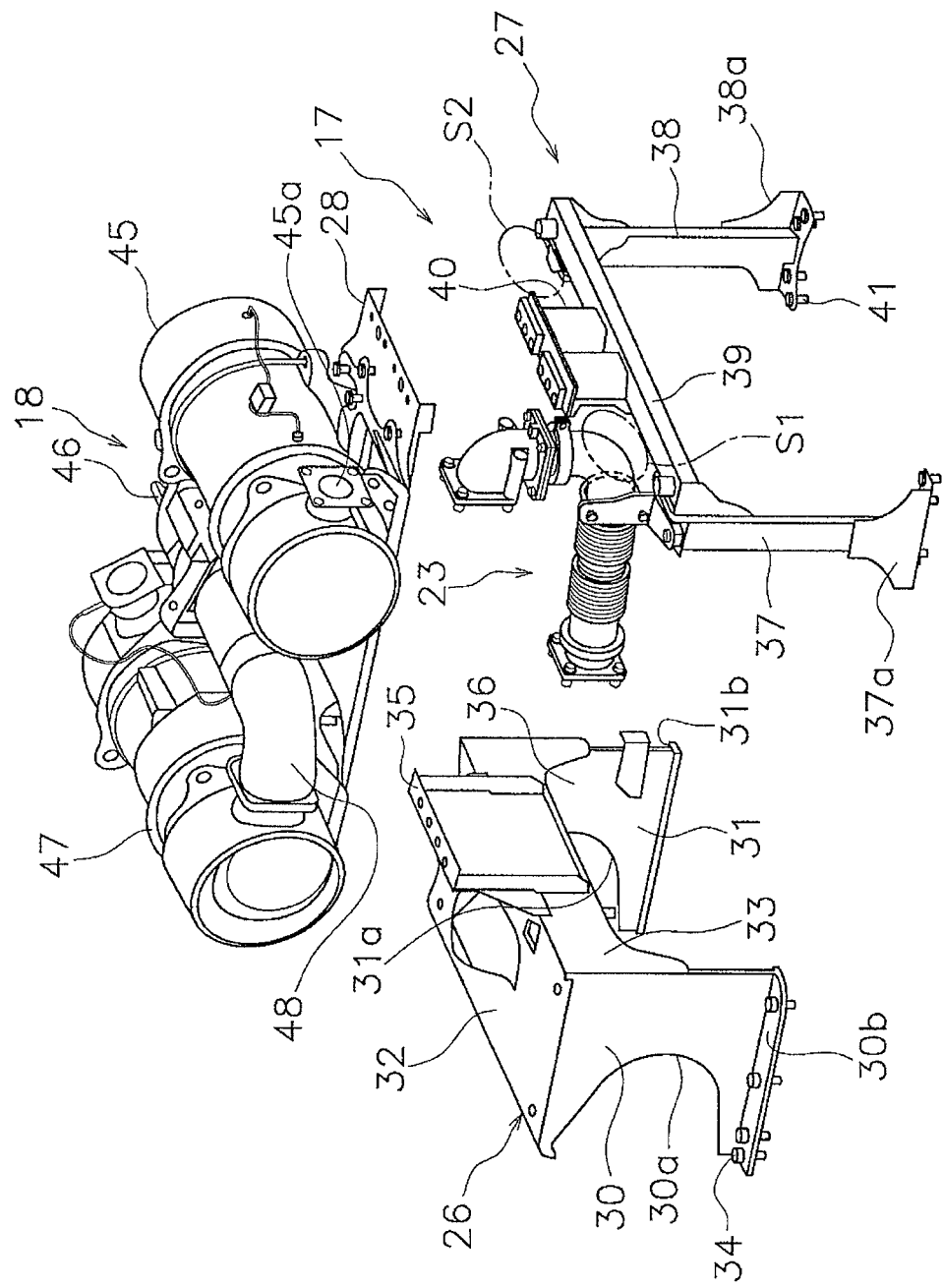
FIG. 6 is an exploded perspective view of the supporting mechanism.

FIG. 5 is a perspective view of a portion of FIG. 3 as seen from the rear. FIG. 6 is a perspective view illustrating the supporting mechanism 17 disassembled. As illustrated in FIGS. 5 and 6, the supporting mechanism 17 is fixed directly to the vehicle body frame 2 with bolts and is configured by a front supporting frame 26, a rear supporting frame 27, and a base plate 28. More specifically as illustrated in FIG. 5, side frames 2a, 2b that extend in the front-back direction are provided respectively on the left and right sides of the rear body part. Brackets 29 are provided in the front and back of the left and right side frames 2a, 2b and the front supporting frame 26 and the rear supporting frame 27 are fixed to the brackets 29.

The front supporting frame 26 includes left and right side parts 30, 31, a top plate part 32, and a connecting part 33. Front portions of the left and right side parts 30, 31 are formed in a rectangle shape and respectively have substantially semi-circular notched parts 30a, 31a. Plates of the left and right side parts 30, 31 have attachment parts 30b, 31b formed at the lower ends thereof to extend to the outside. The attachment parts 30b, 31b are fixed with a plurality of bolts 34 to the brackets 29 provided on the inside of the left and right side frames 2a, 2b. The top plate part 32 is provided to connect the upper parts of the left and right side parts 30, 31. The operating fluid tank 19 is mounted on the upper surface of the top plate part 32. That is, the front supporting frame 26 also acts as a base to support the operating fluid tank 19. The connecting part 33 connects the rear parts of the left and right side parts 30, 31. The center part in the crosswise direction of the connecting part 33 projects further upward than the upper surface of the top plate part 32 to form a front supporting part 35. The width in the crosswise direction of the front supporting part 35 is formed to be narrower than the width in the crosswise direction of the top plate part 32.

The rear supporting frame 27 includes left and right posts 37, 38, a top beam 39, and a rear supporting part 40. The left and right posts 37, 38 respectively include attachment parts 37a, 38a at the lower ends thereof. The attachment parts 37a, 38a are substantially triangular as seen from the side and the lower ends thereof are formed to extend toward the inside. The portions extending toward the inside are fixed with a plurality of bolts 41 to the brackets 29 provided on the inside of the left and right side frames 2a, 2b. The top beam 39 connects the upper parts of the left and right posts 37, 38, and the rear supporting part 40 is provided in the center part in the crosswise direction of the top beam 39. The rear supporting part 40 projects further upward than the top beam 39 and is formed to be at the same height as the front supporting part 35 of the front supporting frame 26.

Since the rear supporting part 40 projects upward further than the top beam 39 and the width in the crosswise direction is shorter than the top beam 39 in the rear supporting frame 27 as described above, spaces S1, S2 for disposing members are formed in the crosswise direction of the rear supporting part 40. In the present embodiment, a portion of the pipe unit 23 and the pipes 42a, 42b connected to a cooling unit 16 are disposed so as to use the spaces S1, S2 as illustrated in FIG. 3.

The base plate 28 is provided between the front supporting part 35 of the front supporting frame 26 and the rear supporting part 40 of the rear supporting frame 27. The base plate 28 is formed to have a rectangular shape and the width in the crosswise direction is substantially the same as the widths of the front supporting part 35 and the rear supporting part 40.

Figure 7:
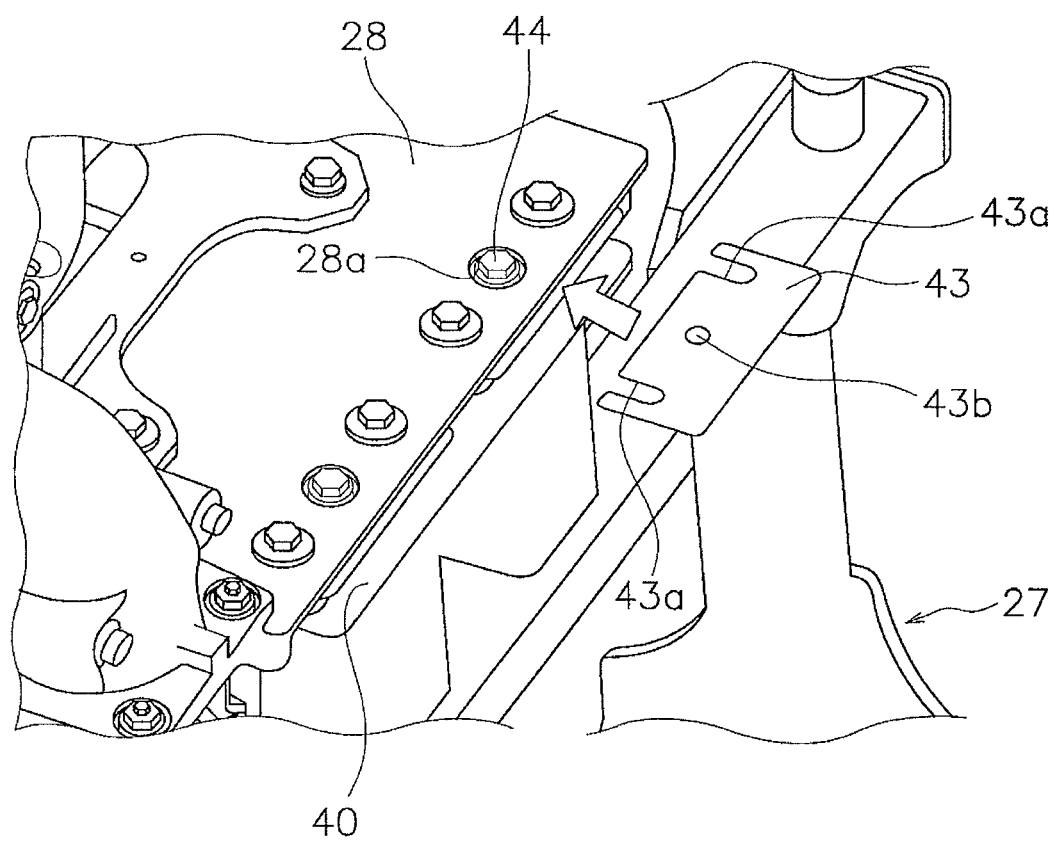
FIG. 7 illustrates a shim attached to the supporting mechanism.

As illustrated in FIG. 7, a shim 43 can be mounted in two locations in the crosswise direction between the bottom surface of the base plate 28 and the top surface of the rear supporting part 40 of the rear supporting frame 27 (only one is illustrated in FIG. 7). The shim 43 is used for adjusting the height of the exhaust gas post-processing device 18 and the pipe unit 23 when the base plate 28 upon which is mounted the exhaust gas post-processing device 18 is fixed to the rear supporting part 40 of the rear supporting frame 27. The shim 43 is rectangular and has a pair of notches 43a that open to one side at both ends in the crosswise direction, and a through hole 43b located between the pair of notches 43a.

The shim 43 is fixed to the upper surface of the rear supporting part 40 by a bolt 44. A large hole 28a with a diameter greater than the head of the bolt 44 is formed in the base plate 28 in the location where the bolt 44 is provided. Obstruction between the base plate 28 and the bolt 44 can be avoided due to the hole 28a. Therefore, the base plate 28 can be attached or detached with the shim 43 fixed to the rear supporting part 40.

The shim 43 can be prepared in various thicknesses or one or a plurality of shims 43 can be used in combination to allow the height to be adjusted.

Exhaust Gas Post-Processing Device 18

As illustrated in FIGS. 5 and 6, the exhaust gas post-processing device 18 is equipped with a diesel particulate filtering device 45, a connecting pipe 48, and a nitrogen oxide reduction catalytic converter 47 in order from the exhaust gas upstream side of the engine 15 (hereinafter referred to simply as "upstream side"). A urea aqueous solution mixing device 46 is attached to the connecting pipe 48.

The diesel particulate filtering device 45 collects particulate matter such as soot and the like in the exhaust gas, and is mounted on the rear part of the base plate 28 of the supporting mechanism 17. The urea aqueous solution mixing device 46 emits a urea aqueous solution sucked up by a pump that is not illustrated from a urea aqueous solution tank that is not illustrated, and adds the urea aqueous solution to the exhaust gas as a reducing agent. The added urea aqueous solution is hydrolyzed to become ammonia, and the ammonia is fed with the exhaust gas through the connecting pipe 48 to the nitrogen oxide reduction catalytic converter 47. The ammonia from the urea aqueous solution mixing device 46 is used as the reducing agent to purify by reduction the nitrogen oxides in the exhaust gas in the nitrogen oxide reduction catalytic converter 47. The nitrogen oxide reduction catalytic converter 47 is mounted on the front part of the base plate 28 of the supporting mechanism 17 in the same way as the diesel particulate filtering device 45. The diesel particulate filtering device 45 and the nitrogen oxide reduction catalytic converter 47 are fixed to the base plate 28 via each of the separate attachment plates.

The diesel particulate filtering device 45 and the nitrogen oxide reduction catalytic converter 47 are disposed parallel to each other. Specifically, the diesel particulate filtering device 45 and the nitrogen oxide reduction catalytic converter 47 are both cylindrical and the center axes thereof are disposed so as to extend in the crosswise direction and are parallel to each other. An exhaust gas inlet 45a is provided on the left edge part of the diesel particulate filtering device 45, and an opening of the exhaust gas inlet 45a faces toward the rear. An exhaust gas outlet 45b is provided on the right edge part of the diesel particulate filtering device 45, and an opening of the exhaust gas outlet 45b faces toward the front. An exhaust gas inlet 47a is provided on the left edge part of the nitrogen oxide reduction catalytic converter 47, and an opening of the exhaust gas inlet 47a faces toward the rear. An exhaust gas outlet 47b is provided on the right edge part of the nitrogen oxide reduction catalytic converter 47, and an opening of the exhaust gas outlet 47b faces toward the rear and obliquely upward. The connecting pipe 48 is disposed between the exhaust gas outlet 45b of the diesel particulate filtering device 45 and the exhaust gas inlet 47a of the nitrogen oxide reduction catalytic converter 47.

Figure 10:
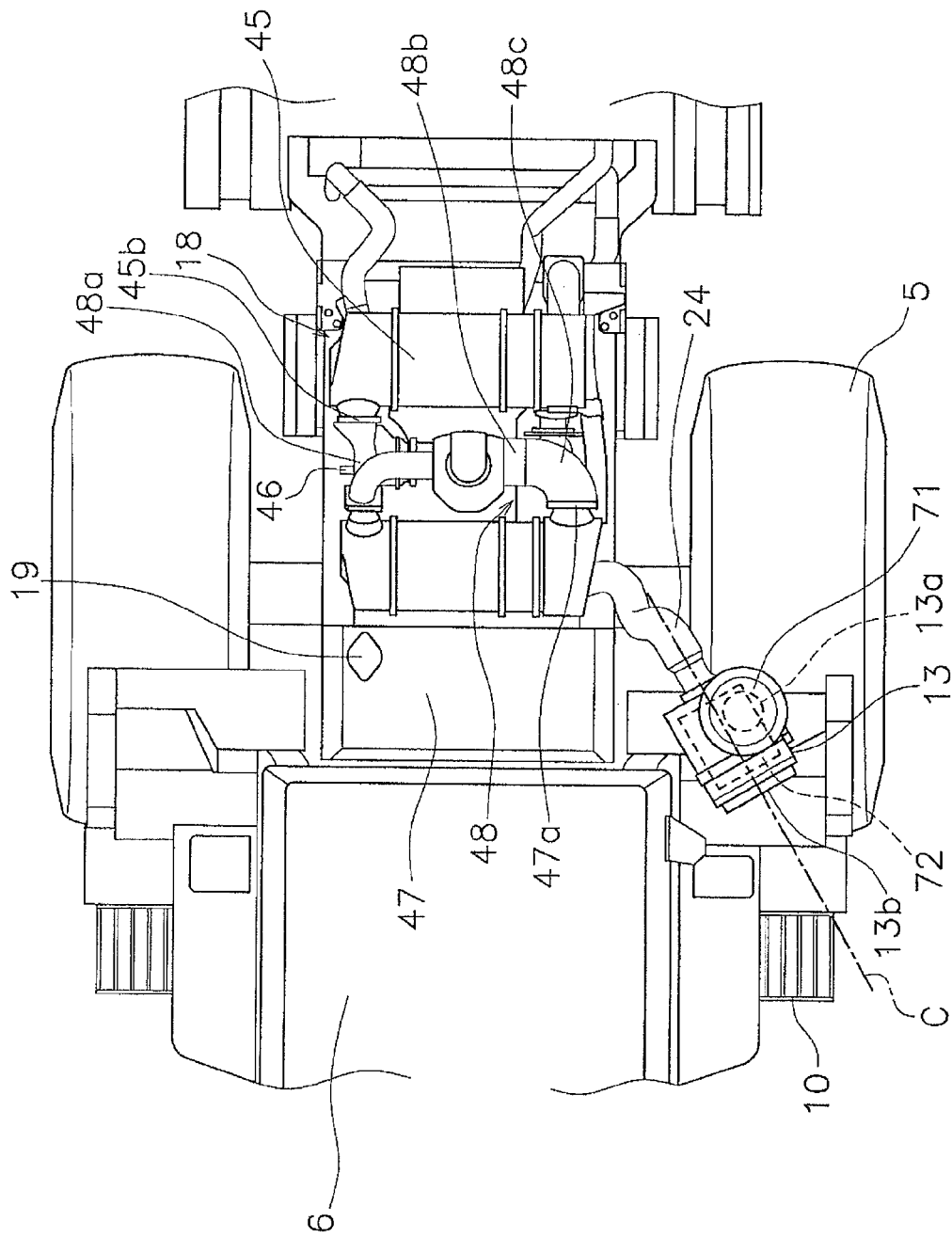
FIG. 10 is a plan view of a disposition of the air cleaner.

As illustrated in FIGS. 5 and 10, the connecting pipe 48 has a first bend part 48a, a linear part 48b, and a second bend part 48c, and the entire connecting pipe 48 forms an S shape. The first bend part 48a is located near the exhaust gas outlet 45b of the diesel particulate filtering device 45, and the second bend part 48c is located near the exhaust gas inlet 47a of the nitrogen oxide reduction catalytic converter 47. The linear part 48b is located between the first bend part 48a and the second bend part 48c and is disposed parallel to the diesel particulate filtering device 45 and the nitrogen oxide reduction catalytic converter 47.

The urea aqueous solution mixing device 46 is provided on the first bend part 48a and emits a urea aqueous solution into the connecting pipe 48. The emitted urea aqueous solution becomes evenly mixed with the exhaust gas while passing through the long linear part 48b.

The lengths in the crosswise direction of the of the diesel particulate filtering device 45 and the nitrogen oxide reduction catalytic converter 47 are formed to be longer than the width in the crosswise direction of the base plate 28.

Pipe Unit 23

Figure 8:
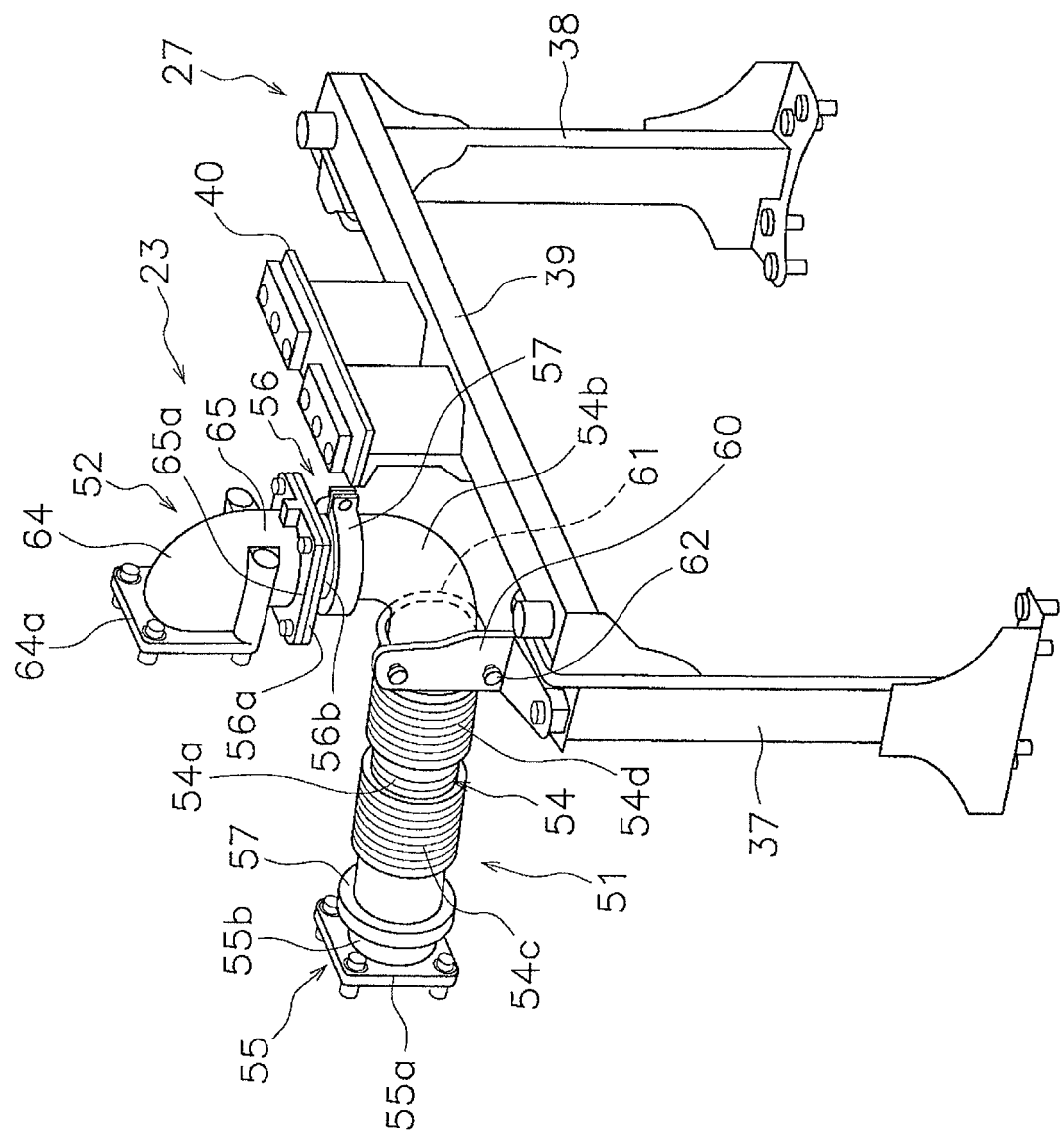
FIG. 8 is an external perspective view of a pipe unit.

FIG. 8 illustrates an enlargement of the pipe unit 23. The pipe unit 23 has an upstream side pipe 51 and a downstream side pipe 52.

The upstream side pipe 51 includes a pipe body 54, and a front flange 55 and a rear flange 56 respectively provided at either end of the pipe body 54. Spherical joints 57 are provided between the pipe body 54 and the front and rear flanges 55, 56.

The pipe body 54 is made of stainless steel and includes a linear extending part 54a that extends from the front toward the rear, and a bend part 54b that bends upward from the rear end part of the extending part 54a. Two bellows-like flexible pipe parts 54c, 54d are formed in the extending part 54a. The front and rear flanges 55, 56 respectively include rectangular connecting end faces 55a, 56a, and pipe parts 55b, 56b that respectively extend from the connecting ends 55a, 56a. The connecting end face 55a of the front flange 55 is coupled to an exhaust gas outlet of the turbo charger 22. The connecting end face 56a of the rear flange 56 is coupled to the downstream side pipe 52.

A spherical joint that uses the known technology disclosed in US Patent No. 2011/007415 may be used for example as the spherical joint 57.

As illustrated in FIG. 8, the upstream side pipe 51 is fixed to the left post 37 of the rear supporting frame 27 via a fixing plate 60 and a U-shaped metal fitting 61. The fixing plate 60 is L-shaped and a lower side thereof is fixed to the upper part of the left post 37. Both ends of the U-shaped metal fitting 61 that holds the rear part (exhaust gas downstream side) of the flexible pipe part 54d of the pipe body 54 are fixed to the standing side of the fixing plate 60 with nuts 62.

The downstream side pipe 52 is a 90-degree elbow and includes a first pipe part 64 that is coupled to the diesel particulate filtering device 45, and a second pipe part 65 that is orthogonal to the first pipe part 64. The second pipe part 65 is configured by the bend part 54b of the upstream side pipe 51 and a linking part that links the lower and upper parts of the pipe unit 23.

A flange 64a is formed at the exhaust gas downstream side end of the first pipe part 64, and the flange 64a is coupled to the exhaust gas inlet 45a of the diesel particulate filtering device 45. A flange 65a is formed at the exhaust gas upstream side end of the second pipe part 65, and the flange 65a is coupled to the connecting end face 56a of the rear flange 56 of the upstream side pipe 51.

As schematically illustrated in FIG. 9, in the connection of a flange F (collective name for all flanges), one or two bolt through holes H of the flange F is formed to have a larger diameter than the diameter of a coupling bolt B. As a result, when mounting the exhaust gas post-processing device 18 on the base plate 28 to make a sub-unit and assembling the sub-unit with the pipe unit 23 fixed to the rear supporting frame 27, an assembly error can be absorbed even if an error exists in the positional relationship between the exhaust gas post-processing device 18 and the pipe unit 23. That is, the assembly construction of the flanges F functions as an adjusting mechanism for adjusting the assembly location.

Air Cleaner 13

The air cleaner 13 and a disposition thereof are explained with reference to FIGS. 2 and 11. The air cleaner 13 is provided outside of the engine room and on the upper part of the rear wheel fender 5a. The rear wheel fender 5a is configured of a fender front part 5b, and a fender rear part 5c fastened to the fender front part 5b. The fender front part 5b is configured by a horizontal part and a sloped part that slopes forward and downward from the horizontal part. The fender rear part 5c is formed in an arced shape as seen from the side and covers the upper part and the upper rear part of the rear wheel 5. The air cleaner 13 is mounted on the horizontal part of the fender front part 5b.

As illustrated in FIG. 2, except for a portion thereof, the air cleaner 13 is covered by an air cleaner cover 70 that is provided on the outside of the vehicle body cover 9. FIG. 11 is a plan view of the air cleaner 13 and portions related to the air cleaner 13 with the vehicle body cover 9 and the air cleaner cover 70 removed.

Figure 11:
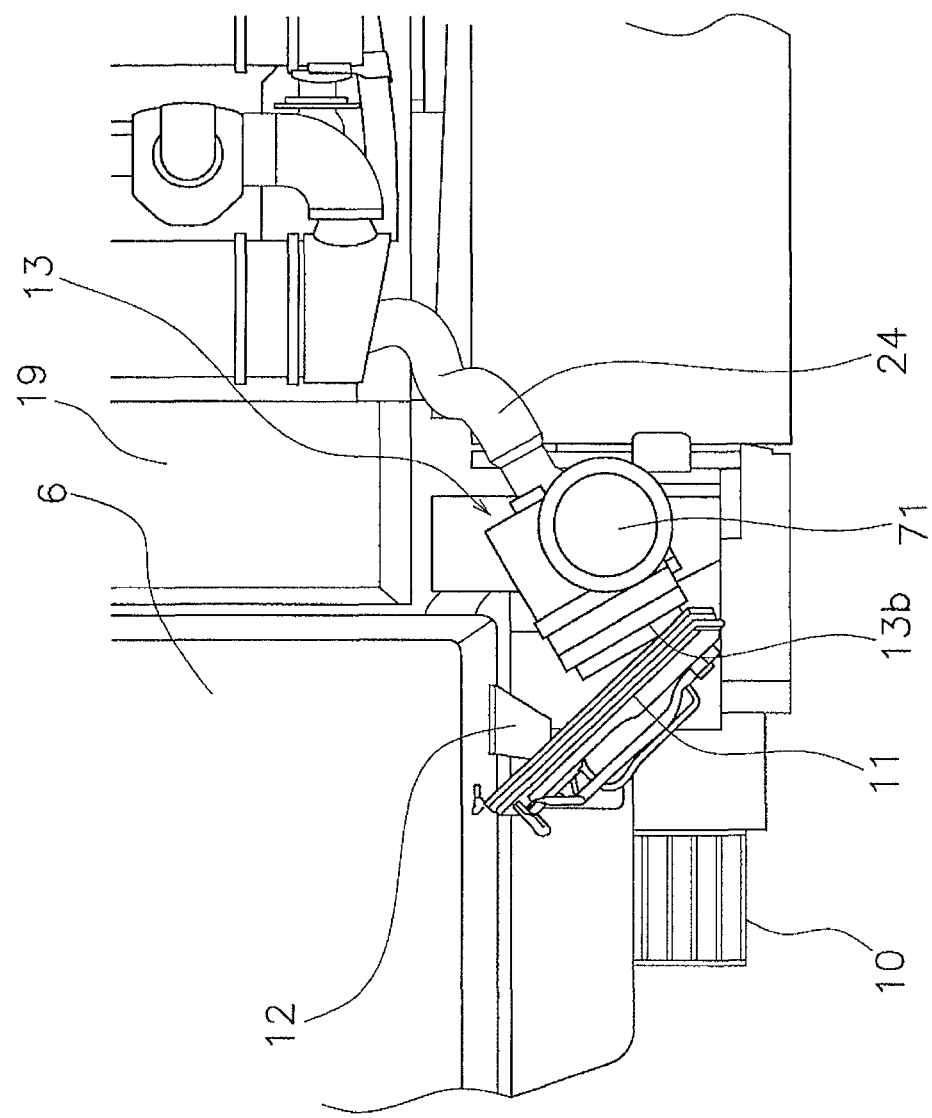
FIG. 11 illustrates a relationship between the air cleaner and the door.

As illustrated in FIGS. 2 and 11, the air cleaner 13 is cylindrical and a cap 71 that covers the air inlet 13a is provided on the upper part of the air cleaner 13, and an openable and closable lid 13b is provided on the front part of the air cleaner 13. A filter 72 is provided in an attachable and detachable manner inside the air cleaner 13. The air cleaner cover 70 covers most of the air cleaner 13 excluding the front end part to which the air inlet 13a, the cap 71, and the lid 13b are attached. The filter 72 can be maintained and exchanged by opening the lid 13b and pulling the filter 72 out obliquely toward the front.

The disposition of the air cleaner 13 is explained in detail below.

As illustrated in FIG. 11, the air cleaner 13 is disposed on the upper part of the fender front part 5b of the rear wheel fender 5a and the lateral side of the rear of the cab 6. More specifically, the front part of the air cleaner 13 is located to the rear of the steps 10 and beside the rear end part of the cab 6, and the rear part of the air cleaner 13 is located beside the front part of the operating fluid tank 19. The center axis C of the air cleaner 13 is substantially horizontal and is slanted with respect to the center axis extending to the front and rear of the vehicle so that the front part of the air cleaner 13 is further away from the cab 6 than the rear part. As described above, the filter 72 can be removed toward the front along the center axis C.

Figure 12:
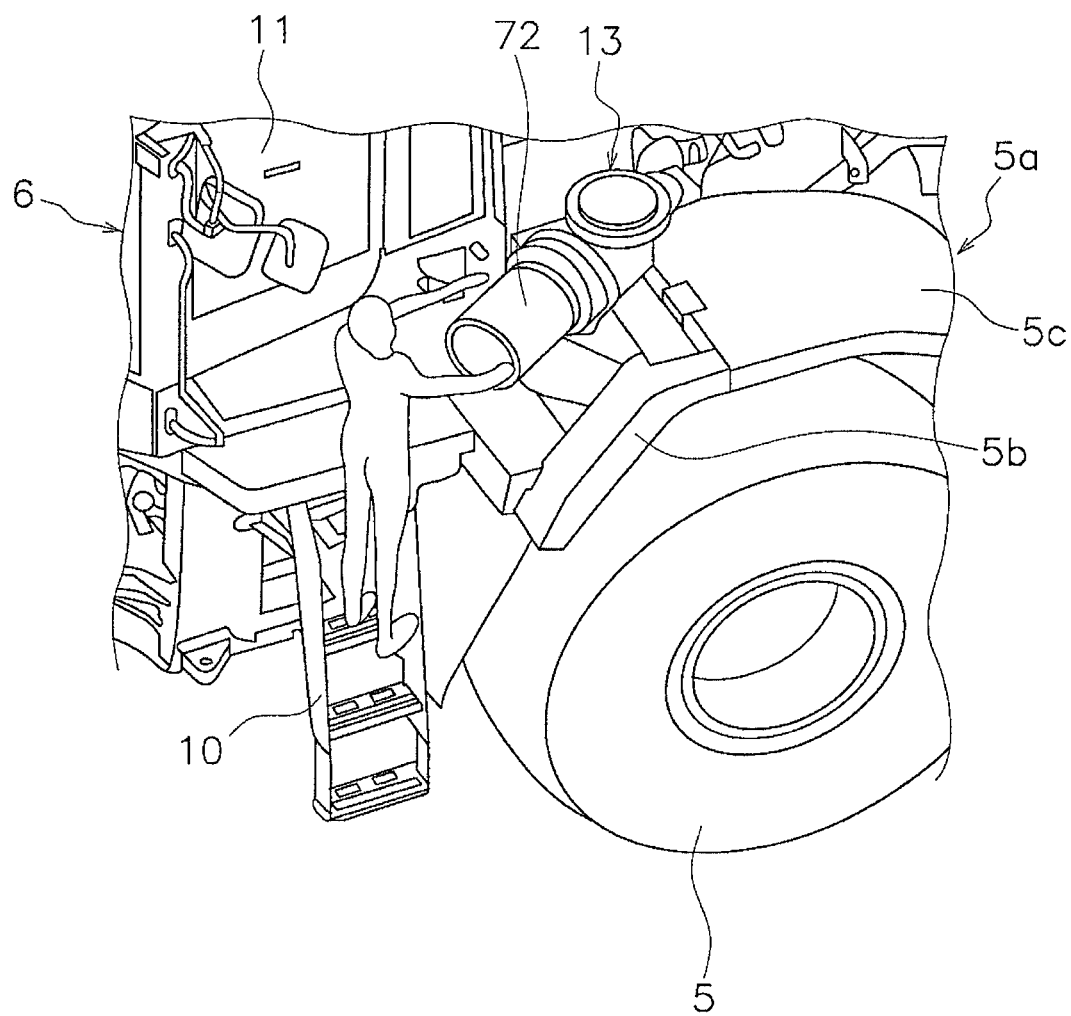
FIG. 12 illustrates an appearance of maintenance work on the air cleaner.

As described above, the stopper 12 is provided on the cab 6 to limit the maximum opening degree of the door 11, and as illustrated in FIG. 12, the front end part of the air cleaner 13 is disposed in a location that does not obstruct the door 11 even if the door 11 is opened to the maximum to abut the stopper 12.

Due to the disposition of the air cleaner 13 as described above, the operator can stand on the steps 10 and open the lid 13b of the air cleaner 13 to easily perform maintenance or exchange work of the filter 72 as illustrated in FIG. 12.

Flow of Air and Exhaust Gas

As illustrated in FIG. 3, air is introduced from the air cleaner 13 and fed into the engine 15 through the intake pipe 24 and the turbo charger 22. Exhaust gas from the engine 15 is introduced through the pipe unit 23 into the exhaust gas post-processing device 18 after driving the turbo charger 22.

Particulate matter such as soot is collected by the diesel particulate filtering device 45 in the exhaust gas post-processing device 18. Next, the particulate matter is introduced into the urea aqueous solution mixing device 46. Urea aqueous solution is emitted into the exhaust gas to mix with the exhaust gas in the urea aqueous solution mixing device 46. Consequently, the urea aqueous solution is hydrolyzed by the heat of the exhaust gas and water vapor in the exhaust gas to become ammonia. The ammonia generated in this way is fed with the exhaust gas through the connecting pipe 48 to the nitrogen oxide reduction catalytic converter 47. The ammonia is used as the reducing agent to purify by reduction the nitrogen oxides in the exhaust gas in the nitrogen oxide reduction catalytic converter 47.

Attachment and Detachment of Exhaust Post-Processing Device 18

The diesel particulate filtering device 45 is desirably removed from the vehicle at prescribed time periods for maintenance. Accordingly, the exhaust gas post-processing device 18 is made into a sub-unit with the base plate 28 to facilitate assembly and maintenance of the exhaust gas post-processing device 18. When assembling the sub-unit onto the supporting mechanism 17, the pipe unit 23 is fixed to the engine 15 and the supporting mechanism 17.

Specifically, the front flange 55 of the upstream side pipe 51 is coupled to the exhaust gas outlet of the turbo charger 22, and the downstream side of the flexible pipe 54*d* of the pipe body 54 is fixed to the supporting mechanism 17 with the fixing plate 60 and the U-shaped metal fitting 61. When coupling the upstream side pipe 51 to the turbo charger 22, the upstream side pipe 51 and the spherical joint 57 on the exhaust gas upstream side are coupled in temporarily. The U-shaped metal fitting 61 is also attached temporarily.

Next, the downstream side pipe 52 is coupled to the upstream side pipe 51. The upstream side pipe 51 and the downstream side pipe 52 may be coupled to each other before coupling the upstream side pipe 51 to the turbo charger 22. As described above, in this case the flanges 56 and 65*a* are coupled to each other with the exhaust gas downstream side spherical joint 57 in a temporarily attached state.

As described above, the sub-unit is supported by the supporting mechanism 17 in a state in which the pipe unit 23 is fixed to the engine 15 and the supporting mechanism 17 side. When assembling the sub-unit on the supporting mechanism 17, both the heights thereof are adjusted by the shim 43 and adjustment in the front-rear, vertical, and crosswise directions are performed by adjusting the assembly of the flanges 64*a*, 65*a* at both ends of the downstream side pipe 52. Further, angle adjustment of the sub-unit and the supporting mechanism 17 is performed with the spherical joints 57 at either end of the upstream side pipe 51. The shim adjustments are rarely performed during maintenance since the adjustments are performed by the manufacturer before shipping.

Since the relatively long flexible pipe parts 54*c*, 54*d* are provided in the upstream side pipe 51 of the pipe unit 23, an assembly error can be absorbed by the flexible pipe parts 54*c*, 54*d* when performing the above adjustment.

As described above, when the location of the sub-unit is adjusted appropriately with the engine 15 and the supporting mechanism 17, the temporarily fastened parts are firmly fixed and the assembly work is completed.

In the state in which the exhaust gas post-processing device 18 is assembled, the engine 15 and the transmission 20 are mounted on the vehicle body frame 2 via rubber mounts 21, and the exhaust gas post-processing device is mounted directly onto the vehicle body frame 2 via the supporting mechanism 17. As a result, a difference arises between the vibration from the engine 15 and the vibration from the exhaust gas post-processing device 18 while the vehicle is being operated.

However, the difference between the two vibrations can be sufficiently absorbed since the relatively long flexible pipe parts 54*c*, 54*d* are formed in the extending part 54*a* of the pipe unit 23. Therefore, the vibration of the engine 15 can be suppressed.

Air Cleaner 13 Maintenance

Changing and cleaning of the filter 72 are desirably performed at prescribed time periods in the air cleaner 13. At such times, the filter 72 is desirably removed from the air cleaner 13.

When removing the filter 72 from the air cleaner 13, the operator stands on the steps 10 and opens the lid 13*b* of the air cleaner 13 as illustrated in FIG. 13. The filter 72 of the air cleaner 13 may be pulled out toward the front along the center axis C of the air cleaner 13. At this time, since the air cleaner 13 is slanted so that the front side thereof is further away from the cab 6 than the rear side thereof, the work to remove the filter 72 is easy to perform.

Characteristics (1) The pipe unit 23 extends from to the rear the turbo charger 22 and passes the diesel particulate filtering device 45. The end of the pipe unit 23 is bent upwards so as to be connected from the rear to the exhaust gas inlet 45*a* of the diesel particulate filtering device 45. As a result, a sufficient length of the extending part 54*a* of the pipe unit 23 can be achieved and relatively long flexible pipe parts 54*c*, 54*d* can be formed in the extending part 54*a*. Therefore, a difference in vibration between the engine 15 and the exhaust gas post-processing device 18 can be sufficiently absorbed by the long flexible pipe parts 54*c*, 54*d*.

(2) Since the pipe unit 23 is configured by the upstream side pipe 51 and the downstream side pipe 52, a configuration for permitting positional aberration at the coupling parts of both of the pipes 51 and 52 can be used. Therefore, an installation error between the engine 15 and the exhaust gas post-processing device 18 can be sufficiently absorbed by the coupling parts in combination with the long flexible pipe parts 54*c*, 54*d* as described above.

(3) Since the spherical joints 57 are provided at the ends of the upstream side pipe 51, an angle error between the engine 15 side and the exhaust gas post-processing device 18 side can be easily absorbed in combination with the long flexible pipe parts 54*c*, 54*d* of the upstream side pipe 51.

(4) The exhaust downstream side (rear portion) of the flexible pipe parts 54*c*, 54*d* in the upstream side pipe 51 that configures the pipe unit 23 is fixed to the supporting mechanism 17 with the fixing plate 60 and the U-shaped metal fitting 61. Therefore, the hindrance of effects such as vibration absorption and the like can be avoided and the pipe unit 23 can be fixed securely.

(5) The turbo charger 22 is disposed on the right side of the engine 15 and the exhaust gas inlet 45*a* of the diesel particulate filtering device 45 is formed on the left part. As a result, unnecessary lengthening of the pipe unit 23 that couples the turbo charger 22 and the diesel particulate filtering device 45 can be avoided.

Other Embodiments

The present invention is not limited to the above embodiments and various changes and modifications may be made without departing from the spirit of the invention.

(a) While the pipe unit is configured by the upstream side pipe and the downstream side pipe in the previous embodiment, the configuration of the pipe unit is not limited to the embodiment. For example, the pipe unit may be configured with three or more pipes.

(b) While the flexible pipe parts are provided in two locations in the pipe unit in the above embodiment, the flexible pipe parts may be provided in one location or may be divided to be provided in three or more locations.

(c) The exhaust gas post-processing device is not limited to the configuration that includes the diesel particulate filtering device and the nitrogen oxide reduction catalytic converter. The present invention may be effectively applied as well to an exhaust gas post-processing device that does not include a nitrogen oxide reduction catalytic converter.

(d) While a wheel loader has been described as an example of the work vehicle in the above embodiment, the present invention may be applied in the same way to a work vehicle such as a motor grader.

In the illustrated embodiment, a difference in vibrations from the engine side and from the diesel particulate filtering device side and an installation error between the engine side and the diesel particulate filtering device side can be sufficiently absorbed in the work vehicle in which the diesel particulate filtering device is mounted on the supporting mechanism provided separately from the engine.

What is claimed is:

1. A work vehicle comprising:
  a vehicle frame;
  an engine mounted on the vehicle frame;
  a supporting mechanism fixed to the vehicle frame;
  a diesel particulate filtering device mounted on the supporting mechanism above the engine and disposed so that an exhaust gas flows through an inside of the diesel particulate filtering device in a crosswise direction of the vehicle, the diesel particulate filtering device having an exhaust gas inlet facing rearward on one side in the crosswise direction of the vehicle; and
  a connecting pipe including an upstream side pipe of which an exhaust upstream side end part is coupled to an exhaust part of the engine and a downstream side pipe of which an exhaust downstream side end part is connected to an exhaust gas inlet of the diesel particulate filtering device from a rear, the upstream side pipe including
  a linear extending part disposed below the diesel particulate filtering device and beside the engine on the same side as the exhaust gas inlet is provided, the extending part extending from the exhaust upstream side end part passing the diesel particulate filtering device to the rear in a front-rear direction of the vehicle, a flexible pipe part being provided in the extending part, and
  a bend part bending upward from a rear end part of the extending part, the downstream side pipe including
  a first pipe part of which an exhaust downstream side end part is coupled to the exhaust gas inlet of the diesel particulate filtering device and extends rearward, and
  a second pipe part having a certain angle with respect to the first pipe part and provided between an exhaust upstream side of the first pipe part and an exhaust downstream side of the bend part of the upstream side pipe.

2. The work vehicle according to claim 1, wherein the upstream side pipe includes
  a pipe body comprising the extending part and the bend part;
  a front flange and a rear flange respectively provided at either end of the pipe body; and
  spherical joints provided between the pipe body and the front and rear flanges.

3. The work vehicle according to claim 1, further comprising
  a fixing member for fixing the exhaust downstream side part of the flexible pipe part of the upstream side pipe to the supporting mechanism.

4. The work vehicle according to claim 3, wherein the fixing member includes
  a fixing plate fixed to the supporting mechanism; and
  a U-shaped metal fitting for fixing the exhaust downstream side part of the extending part of the upstream side pipe to the fixing plate.

5. The work vehicle according to claim 1, further comprising:
  a nitrogen oxide reduction catalytic converter provided for reducing nitrogen oxides in the exhaust gas and mounted on the supporting mechanism in front of the diesel particulate filtering device.

6. The work vehicle according to claim 5, wherein a front end of the connecting pipe is located between the diesel particulate filtering device and the nitrogen oxide reduction catalytic converter.

7. The work vehicle according to claim 5, wherein the exhaust gas inlet of the diesel particulate filtering device is provided on the same side as the exhaust part of the engine in the crosswise direction of the vehicle.

8. The work vehicle according to claim 5, wherein the diesel particulate filtering device has an exhaust gas outlet that faces frontward on the side opposite the exhaust gas inlet; and
the nitrogen oxide reduction catalytic converter is disposed in the same direction in which the diesel particulate filtering device is disposed so that the exhaust gas flows in the same direction as that of the diesel particulate filtering device.

* * * * *